United States Patent [19]

Neuhouser

[11] 4,110,807
[45] Aug. 29, 1978

[54] CONTINUITY MONITORING SYSTEM

[75] Inventor: Donald Eugene Neuhouser, Huntington, W. Va.

[73] Assignee: Harvey Hubbell, Incorporated, Orange, Conn.

[21] Appl. No.: 793,112

[22] Filed: May 2, 1977

[51] Int. Cl.² .............................................. H02H 1/02
[52] U.S. Cl. ....................................... 361/42; 324/51; 340/652; 361/48; 361/50
[58] Field of Search ............................. 361/42, 44–50, 361/93, 100, 102; 340/255, 256; 324/51

[56] References Cited
U.S. PATENT DOCUMENTS

| 3,676,739 | 7/1972 | Neuhouser | 324/51 X |
| 3,840,782 | 10/1974 | Monaghan | 340/256 X |

FOREIGN PATENT DOCUMENTS 892,468  3/1962  United Kingdom ...................... 324/51

Primary Examiner—Harry E. Moose, Jr.
Attorney, Agent, or Firm—Jerry M. Presson

[57] ABSTRACT

Disclosed is a system for monitoring the resistance in the pilot and ground conductors of a power cable and for interrupting power if the resistance exceeds a predetermined limit established for the particular cable. Novel circuit arrangements are employed to reset and calibrate the system.

11 Claims, 1 Drawing Figure

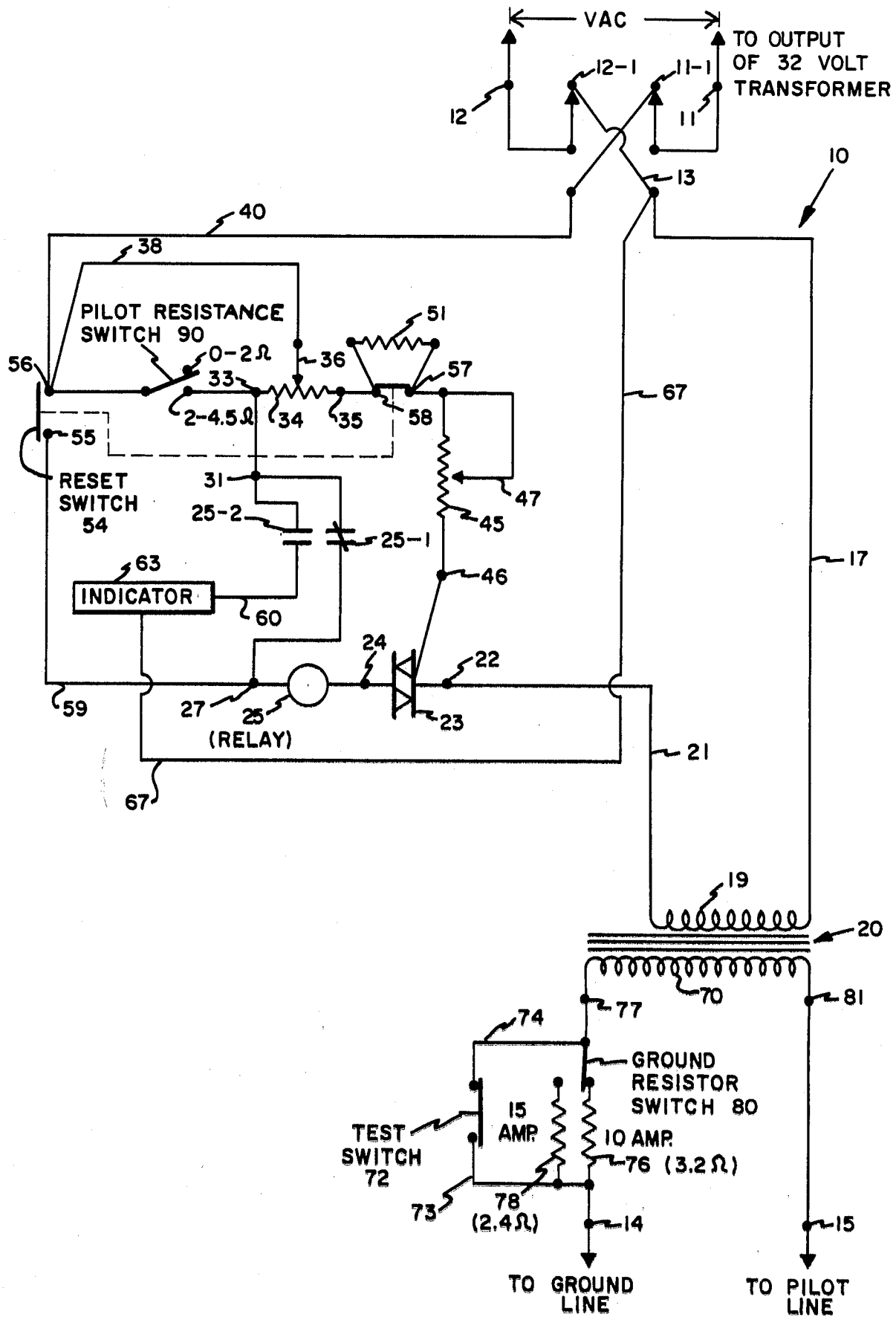

CONTINUITY MONITORING SYSTEM

INTRODUCTION

This invention relates generally to a system for checking the continuity of a ground wire in a power cable and more particularly to a system for monitoring the resistance of the pilot and ground lines of an electrical cable for supplying electrical power to portable mining equipment.

Electrical power cables which are used to supply electrical power to portable mining equipment are typically comprised of six wires; one pilot wire, two ground wires and three power wires. The determine if there is electrical continuity in the pilot and ground wires, an alternating current signal is impressed on the pilot wire and the return of that signal through the ground wire is monitored. The Mining Enforcement and Safety Administration of the Department of Interior (MESA) has established standards for ground continuity checking systems and requires that the resistance in the ground wire not exceed a value of approximately 3 ohms. Typically, cables which are used in mining applications have a ground resistance which is less than 0.2 ohm. The maximum resistance that the pilot wire may have is not prescribed by MESA; however, it is desirable from the safety standpoint to provide a system which will remove power from the power line whenever the resistance of the pilot and ground wires exceeds some predetermined value as determined by the neutral resistance of the particular power system.

SUMMARY OF THE INVENTION

The system of this invention satisfies all MESA requirements and, as distinguished from prior art systems, ensures that power in the cable will be interrupted after the system is reset to accurately monitor different ranges of values of pilot resistance. This is accomplished by shifting additional voltage to a relay which is used to interrupt the power circuit to compensate for higher resistance values in the pilot and ground lines. Moreover, as contrasted to prior art systems, the instant invention calibrates the system to monitor different ranges of pilot resistance by utilizing a combination of resistors uniquely connected in parallel or series-parallel with the coil of the relay which minimize the wattage requirements of the system.

OBJECTS OF THE INVENTION

An object of this invention is to provide a new and improved system for monitoring the resistance in the pilot and ground lines of a power cable.

Another object of this invention is to provide a system for reliably interrupting the electrical power in an electrical cable when the resistance in the pilot and ground lines exceeds a relatively wide range of resistance values.

Yet another object of this invention is a system for interrupting electrical power in an electrical cable which imposes minimum wattage requirements on the electrical components comprising the system.

Numerous other objects, features and advantages of this invention will become apparent with reference to the accompanying schematic diagram of the system and the accompanying description.

DESCRIPTION

With reference to the drawing, the system 10 includes a source of alternating current voltage which is applied across the terminals 11 and 12 from a suitable reference source of voltage, such as a voltage controlling transformer. The amplitude of the voltage across the terminals 11 and 12 is maintained at a controlled level of typically 32 volts. This voltage is applied to the terminals 11-1 and 12-1 of a polarity reversal switch 13. The switch 13 may be manually operated to reverse the connections of the terminals 11-1 and 12-1 to the terminals 11 and 12, respectively, and hence, the polarity of the voltage received by the terminals 11-1 and 12-1 in the event voltages in phase opposition to the source voltage are induced in an impedance matching transformer 20 to which the ground and pilot lines are connected by way of terminals 14 and 15, respectively.

The terminal 12-1 is connected through the polarity reversal switch 13 to a conductor 17 which is connected to one side of a primary winding 19 of the transformer 20 so that the transformer receives its voltage from the controlled voltage source. The other side of the primary winding 19 is connected by a conductor 21 to one main terminal 22 of a triac 23. The triac 23 has a second main terminal 24 connected to one side or terminal of a relay 25. The other side of the relay is connected to a terminal 27.

The relay 25 has two sets of contacts 25-1 and 25-2, respectively, which are operated under its control. The respective closed and open states of the contacts 25-1 and 25-2 as shown in the drawing are those states the contacts have when the relay 25 is energized (or picked up). Conversely, when the relay 25 is deenergized (or dropped out), the contacts 25-1 open and the contacts 25-2 close. The relay is a conventional electromagnetic relay having a coil and an armature. To facilitate the understanding of its operation, it may be assumed that the relay has a drop-out voltage level of 12 volts and a pick-up voltage level of 18 volts. As is conventional in this art, other contacts of the relay are in the circuit of a circuit breaker (not shown). The circuit breaker controls the application of power for the power line operating to remove power from the line in response to the relay dropping out. When therelay picks up, power may be restored to the cable upon the manual resetting of the circuit breaker.

The relay contacts 25-1 are connected in series with the terminal 27 of the relay 25 and a terminal 31 which is a terminal common to one side of the relay contacts 25-2. The terminal 31 is connected to a terminal 33 at an adjoining end of a wire resistor coil of a rheostat 34 which may, for example, have a resistance value of 1K ohms. The rheostat 34 calibrates the relay 25 to drop-out when the resistance in the pilot-ground loop reaches predetermined value signifying a loss in electrical continuity in that loop. Terminal 35 is at the opposite end of that resistance coil. The rheostat 34 has a manually moveable wiper arm 36 which taps off different portions of the resistor coil as it is moved. The opposite end of the wiper connected via a conductor 38 to a terminal 56 which also constitutes one contact of a pushbutton reset switch 54. The terminal 56 is connected by a conductor 40 in series with the terminal 11-1 of the polarity reversal switch 13. The other contact 55 of the reset switch 54 serially connected by a conductor 59 to the relay terminal 27.

A pilot line resistance switch 90 is connected in series circuit between the rheostat terminal 33 and the reset contact terminal 56 and is manually moveable between two contact positions designated respectively as 0-2 and 2-4.5. These contact positions are so designated to correspond to two ranges of prescribed values for the ohmic resistance in the pilot and ground lines of the power cable to which the system is calibrated. When the switch 90 bridges the depicted 0-2 ohms contact position, the series connection between the terminals 33 and 56 is broken and the voltage at terminal 56 is applied through the wiper 36 to the terminal 33 whereas, when the switch 90 bridges contacts 2-4.5, the series circuit is reestablished and the voltages at terminals 33 and 56 are equal. With the switch 90 in the 0-2 position, a first series branch for the relay 25 extends from the wiper 36 through that leftward portion of the rheostat which is tapped off through the contacts 25-1 to the relay terminal 27.

The reset switch 54 also has a set of contacts 57 and 58 in a second series branch commencing at the wiper 36 and ending at the triac gate 46. The contacts 57 and 58 are normally held closed by the pushbutton switch 54 to short circuit a resistor 51 which is in parallel with the contacts. The resistor 51 is used to maintain the triac 23 fully conductive during reset so that relay 25 is caused to pick-up and lock itself in by closing its contacts 25-1. If the reset switch 54 is not depressed, the resistor 51 will be shorted out through the closed set of contacts 57, 58. The contact set 57 is connected to the upper end, as viewed in the drawing, of a potentiometer 45 having an adjustable wiper 47. The opposite end of the potentiometer 45 is connected to the gate terminal 46 of the triac 23. The potentiometer 45 is adjusted to establish a minimum resistance level for the second circuit branch. Unless there is a minimum resistance level in this branch, one might overload the components, which all receive the same current by reason of their series connections, as a result of one setting the relay calibrating rheostat to a zero or near zero resistance value.

The triac 23 conducts half cycles of alternating current produced by the reference voltage source coupled to the terminals 11 and 12 to the relay 25 and serves to ensure that should the parallel calibrating circuit open, the loss of current to the triac gate terminal 46 will cause the triac to be rendered non-conductive and dropout the relay 25. To monitor the states of the relay 25 by means of its contacts 25-2, there is provided a visual indicator 63 which may take the form of a conventional light-emitting diode. The indicator 63 is serially connected through a conductor 67 to the source terminal 12-1 and through the relay contacts 25-2 and the conductor 40 to the source terminal 11-1. When the relay 25 is picked up, the relay contacts 25-2 will be open and the indicator 63 turned off. Conversely, since the contacts 25-2 close when the relay 25 deenergizes, the series circuit to the reference source will be completed and the indicator 63 will illuminate to provide visual indication that the relay 25 has dropped out and, in normal operation, that power has been removed from the power line of the monitored cable.

The transformer 20 includes a secondary winding 70 having opposite end terminals 77 and 81, respectively. The turns ratio between the secondary winding 70 and the primary winding 19 may be on the order of 10:1. A portion of the voltage appearing across the terminals 11 and 12 appears across the windings 19 and 70. Assuming 32 volts are across the terminals 11 and 12, the voltage appearing across the windings 19 and 70 may be substantially 20 volts. The terminal 77 is connected via a ground resistor switch 80 to the ground or neutral line terminal 14 of the power cable. The terminal 81 is connected to the pilot line terminal 15 of the same cable.

The instant invention may be used to monitor the pilot-to-ground resistance of electrical power cables having different lengths and/or different values of ohmic resistance per lineal foot. For example, a 500 foot length of cable of one wire size may have a resistance of 0.6 ohms whereas, the same length of cable of a smaller wire size may have a resistance as high as 2 ohms. Similarly, cable having a length of, for example, 1,000 feet may exhibit a resistance as high as 4.5 ohms.

It is conventional in the art to which is invention pertains to employ a ground selector switch, such as the switch 80, to select different valued test resistors 76 and 78, to permit the system 10 to test the neutral ground resistance of two or more power systems. A pushbutton test switch 72 connected in series through leads 73 and 74 with the transformer terminal 77 and the ground line terminal 14 shorts out the selected test resistor and the switch 80 as long as the test switch remains closed so that the transformer secondary 70 does not see this additional resistance. As mentioned, two or more resistors, such as resistors 76 and 78 having two or more different sets of resistance values are provided; the number of such resistors depending upon the amplitudes of possible ground current flows in the pilot-ground line.

If it is desired to insert one of the test resistors 76 or 78 into the transformer secondary, the switch 80 is moved to the appropriate terminal at the end of the resistor 76 and 78 and the test switch 72 depressed to open its contact. The selected resistor 76 or 78 is then placed in series with the secondary coil 70 of the transformer 20 just as though it were a pilot-ground resistance. Once the simulation is completed, the test switch 72 is released to restore the system so that it will monitor the resistance of a given cable. A typical calibration sequence for the system is summarized hereinafter by numbered paragraphs.

PROCEDURE FOR CALIBRATING THE SYSTEM

1. Apply 35 volts of alternating current to terminals 11 and 12 to simulate the output of a lightly loaded 32 volt control transformer.

2. Set the pilot resistance switch 90 to bridge the 2-4.5 conatct position.

3. Set ground resistance switch 80 to bridge the 10 ampere position.

4. Connect a 2.0 ohm resistor between terminals 14 and 15.

5. Move the wiper 36 to the short circuit position. This leaves only the resistor 45 in the calibrating branch of the relay circuit.

6. Push and release the reset switch 54 to energize the relay 25.

7. Adjust the wiper 47 of the potentiometer to the highest resistance value at which the relay 25 will dropout. During this test, the pushbotton test switch 72 is held depressed. The indicator 63 illuminates to indicate that the relay 25 has dropped out.

8. To test a cable having a relatively low resistance of between 0 and 2 ohms in its pilot-to-ground loop, the pilot resistance switch 90 is placed in the 0-2 ohm range. The system is then calibrated successively with 0 ohms and with a 2 ohm resistor connected between the terminals 14 and 15. This can be done by open circuiting these terminals and thereafter inserting a resistor of a prescribed 2 ohm value in the secondary winding 70. It is then known that the system is calibrated for values of pilot-ground loop resistance of between 0 and 2 ohms.

9. To test the same cable but with the switch 80 in the 15 ampere position rather than in the 10 ampere position, repeat step (8). There is, of course, no need to change the resistance setting of the potentiometer 45 for this higher value of current.

10. To test a cable with a relatively high resistance of between 2.5 and 4.5 ohms in its pilot-to-ground loop, repeat step (8) with a 2 ohm and a 4.5 ohm resistor successively connected in series with the terminals 14 and 15.

The resistance of the pilot-ground circuit is typically less than 1 ohm but it may vary between 0.5 ohms and 4.5 ohms. Assuming that the impedance matching transformer 20 has a ratio of 10 to 1, when this 1 ohm resistance of the pilot-ground system is transformed, it appears as a resistance of 100 ohms connected in series with the relay circuit 25. Any change in resistance on the secondary is reflected in proportion to the square of the turns ratio between the primary and secondary windings 19 and 70, respectively. In general, the instant system is calibrated to drop-out the relay 25 whenever the pilot-ground loop resistance increases by 2.4 or 3.2 ohms depending upon which system has been selected in the test switch network.

The relay 25 is normally connected in parallel between two series resistive circuit branches. One branch, which may be considered as the calibrating branch or circuit, commences at the relay terminal 24 and is constituted by the triac 23, the resistive portion of the potentiometer 45 tapped off between the wiper 47 and the triac gate 46 and the resistive portion of the rheostat 34 tapped off between the wiper 36 and the terminal 35. Another branch commencing at the relay terminal 27 and extending through the closed contacts 25-1 is constituted by the resistive portion of the rheostat 34 tapped off between the wiper 36 and the terminal 33. As will be evident, the triac 23 is also connected in a series circuit with the transformer coil 19 and the source terminals 11 and 12. The relay 25 is connected in series with the main terminals of the triac 23 and therefore, with the reset switch 54 depressed, the relay picks up and locks itself in when the triac is rendered conductive and drops out when the triac is rendered non-conductive.

In the calibration procedure described hereinabove, the transformer secondary circuit resistance is increased by the amount of resistance provided by either the test resistor 76 or the test resistor 78. When the value of these resistances is greater than 2 ohms, the pilot resistance switch 90 is manually moved to bridge the contacts 2–4.5 corresponding to that range of resistance in the secondary transformer circuit. With the pilot resistance switch 90 in the 2–4.5 contact position, the wiper arm 36 of the rheostat 34 can then be adjusted to decrease the resistance between the wiper 36 and the terminal 35 until the voltage in the calibrating branch which appears across the relay 25 drops to a value which is no longer sufficient to keep the relay energized, whereupon, the relay 25 drops out. With the pilot resistance switch 90 bridging the contacts 2–4.5, that resistive portion of the rheostat between the terminal 33 and the wiper 36 is shorted out thereby decreasing the resistance in the series circuit between the terminals 27 and 33 and in series with the relay. This decrease in resistance lowers the drop-out voltage of the relay 25 proportionately so that the relay will drop-out sooner with a proportionately lower voltage across the terminals 24, 27. This lowering of the drop-out voltage is desired inasmuch as the current in the secondary winding 70 of the transformer decreases proportionately with increases in resistance in the pilot-ground loop and hence, the minimum voltage across the relay coil required to maintain the relay picked up until the predetermined maximum value of the pilot-ground resistance for this higher resistance range is detected, will be lower in proportion to the increase in resistance in the pilot-ground loop.

On the other hand, with the pilot resistance switch 90 bridging the lower resistance range of 0–2 ohms, the system of this invention places the resistive portion of the rheostat 34, which is between the terminal 33 and the wiper 36, in series with the relay 25. In this case, as the wiper 36 is moved toward the terminal 35, proportionately more resistance is placed in series with the relay coil of the relay 25 and less resistance is present in the calibrating branch. With more resistance in series between the wiper 36 and the terminal 27, the relay will drop-out earlier because its drop-out voltage level is increased by an amount proportional to this increase in resistance in series with its relay coil. Hence, the relay 25 will drop-out with the lowest ranges of resistance (given as exemplary values of between 2.4 and 3.2 ohms) in the pilotground loop.

For low values of resistance in the transformer secondary circuit, the calibrating circuit of the invention operating in conjunction with the relay permits the rheostat 34 and the potentiometer 45 to have relatively low wattage requirements, particularly if calibration were otherwise performed with the resistances all connected in parallel as in prior art systems. Hence, the size requirements for both of these resistive elements may be maintained relatively small despite relatively wide ranges of resistance values for which the system is designed.

RESETTING THE SYSTEM

When it is desired to reset the system 10, the pushbutton reset switch 54 is manually depressed to short-circuit the terminals 55 and 56 and to simultaneously open-circuit the contacts 57 and 58. When terminals 55 and 56 are bridged by closure of the reset switch 56, the relay terminal 27 is connected to the contact terminal 56 and thusly, to the source terminal 11-1. That portion of the rheostat 34 between the wiper 36 and the terminal 33 is shorted.

With the system calibrated to monitor the higher range of resistance values, although the voltage across the relay coil of the relay 25 will increase above the drop-out level of assumed 12 volt value, when the reset switch is pressed, this voltage may not increase sufficiently with external resistances of the pilot-ground circuit to the assumed 18 volt threshold voltage level needed to pick-up and lock the relay into its energized state.

This can be demonstrated by assuming that the system is monitoring a cable having a pilot line resistance of 0.6 ohm. As mentioned above, to satisfy MESA requirements, the ground line resistance cannot exceed 3 ohms. Hence, the permissible resistance range for the pilot-ground loop would be from 0.6 ohm to 3.6 ohms.

Following the previous assumption that the transformer has a turns ratio of 10:1, the permissible resistance range in the primary winding would be between 60 ohms and 360 ohms and therefore, the ratio between pick-up and drop-out values is 6. With this ratio there is a substantial increase in the voltage which is applied to the relay between the level where it will pick-up and the level at which it will drop-out once the test switch is released and the 3 ohms resistor is not actually in series with the relay.

On the other hand, for the higher resistance range, assuming that the pilot line resistance is 4.5 ohms and that 3.0 ohms of permissible ground resistance is also in that winding, the ratio is now 1.7 and obviously, much less than 6. Hence, there is considerably less voltage available to the relay for it to reach its pick-up voltage level when the test switch 72 is released and the resistance in the primary and in series with the relay becomes 450 ohms rather than 750 ohms.

In practice, it has been observed that the relay may not pick-up consistently in the 4.5 to 7.5 range.

In accordance with this invention, an additional voltage is effectively shifted across the relay during reset to increase the pick-up threshold level and thereby ensure that the relay will pick-up consistently. This additional voltage may be produced in the system by either decreasing the relay coil.

In accordance with the embodiment of this invention described herein, the additional voltage is applied to the relay coil by the rheostat 34 which, is may be recalled, is also used to calibrate the relay. In addition, the resistor 51 which is normally shunted out of the calibrating circuit is inserted in series with the rheostat 34 and the potentiometer 45 to increase the resistive loading in the triac drive circuit. This has the corresponding affect of unloading the relay circuit so that the relay can reach the pick-up threshold voltage level sooner. The resistor 51 is selected to have a high resistance to produce an incremental increase in the voltage appearing across the relay coil but not high enough to prevent conduction of the triac 23 so that the relay can be energized during reset by current flow through the triac. An exemplary value for the resistor 51 is 1.8K ohms.

Once the relay is energized during the reset, the contacts 25-1 close and hold the relay in its energized state after the contact terminals 55 and 56 are opened. This occurs simultaneously with the restoration of the short circuit across the resistor 51 by the bridging of the contacts 57, 58. The system is then conditioned for monitoring a pilot and ground circuit.

While one advantageous embodiment has been chosen to illustrate the invention, it will be understood by those skilled in the art that various changes and modifications can be made therein without departing from the scope of the invention as defined in the appended claims.

I claim as my invention:

1. A system for monitoring the resistance of the pilot and ground lines in an electrical cable and for interrupting the power in the cable when the resistance exceeds a predetermined value, comprising,
    a transformer having a primary winding and a secondary winding,
    the secondary winding having the pilot and ground lines connected in series therewith,
    a relay for interrupting power in the cable having drop-out and pick-up states, the relay interrupting power in the cable when in the drop-out state and allowing the restoration of power when in the pick-up state, the voltage required to pick-up the relay having a predetermined greater amplitude than the drop-out voltage,
    a source of voltage of substantially constant amplitude for maintaining the relay in the pick-up state,
    first circuit means coupling the voltage source in series with the primary winding of the transformer and the coil of said relay for dropping out the relay when the pilot and ground line series resistance exceeds a predetermined ohmic value, and
    second circuit means coupled to the relay for applying an additional voltage to the relay sufficient to ensure that the relay will pick-up with a given value of resistance in the pilot and ground lines.

2. A system for monitoring the resistance of the pilot and ground lines of an electrical cable having pilot, ground and power lines therein and for interrupting the power in the power line when the resistance exceeds a predetermined ohmic value, comprising,
    a transformer having a primary and a secondary winding, the secondary winding connected in series with the pilot and ground lines,
    a relay comprising a relay coil and having a first state wherein the power in the power line is interrupted and a second state wherein the power in the power line may be restored, the relay coil requiring a higher voltage amplitude for the second state than the first state,
    a source of potential of substantially constant amplitude coupled to the primary winding of said transformer for powering the relay,
    first circuit means including a switch operable to selectively connect said primary winding to said relay coil whereby the state of said relay is controlled,
    second circuit means including a variable resistor coupled to said switch and to said source for driving the relay to said first state when the resistance in the pilot and ground lines exceeds a predetermined ohmic value,
    reset means in the first and second circuit means actuatable to reset the relay into said second state, and
    said second circuit further including a resistor coupled to said relay for unloading said relay upon actuation of said reset means thereby ensuring that the relay is reset into the second state for the given range of resistance in the pilot and ground lines less than said predetermined ohmic value.

3. A system for monitoring the resistance of the pilot and ground conductors in an electrical cable, comprising,
    transformer means having a primary winding and a secondary winding,
    the secondary winding having the pilot and ground conductors connected thereto,
    a relay in series with said primary winding for interrupting power in the cable, said relay having drop-out and pick-up states and interrupting power in the cable when in the drop-out state and allowing restoration of power in the cable when in the picked up state, the voltage required to pick-up said relay being of a predetermined greater amplitude than the drop-out voltage,
    first and second series circuits, said relay connected in parallel with said circuits,
    said first series circuit including a switching device for controlling the states of said relay, said first circuit additionally including a first resistive portion of a variable resistor for calibrating said relay to drop-out with certain values of resistance in the pilot and ground conductors, said second series circuit including a second resistive portion of said variable resistor, and switch means for selectively connecting said second portion of said variable resistor into said second circuit to change the loading of said relay.

4. The system as claimed in claim 3 and further comprising, a source of voltage of substantially constant amplitude coupled to said transformer means and said relay for energizing said transformer means and said relay, and wherein said first resistive portion of said first series circuit is connected in series with said source.

5. The system as claimed in claim 4 wherein said switch means is connected in a circuit having one end connected to said source and the other end connected to said second portion of said variable resistor.

6. The system according to claim 5 wherein said relay includes a first set of contacts in said second circuit for locking said relay into the picked up state.

7. The system according to claim 6 and further comprising, a third circuit connected to said source and to said second resistive portion of said variable resistor, said relay having a second set of contacts in said third circuit, and means in said third circuit controlled by said second set of contacts for indicating the state of said relay.

8. The system according to claim 7 wherein said transformer means comprises first and second windings, the first winding connected in series with said switching device and said source, the second winding connected to the pilot and ground conductors, and means in series with said second winding for selectively inserting a plurality of test resistors in series with said secondary winding.

9. The system according to claim 8 and further comprising, means for resetting the relay to its pick-up state including a resistive element selectively insertable into said first circuit for unloading said relay during reset thereof to ensure that said relay will pick-up with high values of resistance in the pilot conductor.

10. The system according to claim 9 wherein said reset means includes a circuit for selectively short circuiting said second series circuit during reset.

11. The system according to claim 8 wherein said first series circuit includes a potentiometer in series with said first resistive portion of said variable resistor and adjustable to ensure conduction of said switching device for different settings of said variable resistor.

* * * * *